US008856094B2

(12) United States Patent
Smith et al.

(10) Patent No.: US 8,856,094 B2
(45) Date of Patent: *Oct. 7, 2014

(54) REMOTE SEGMENTATION SYSTEM AND METHOD

(75) Inventors: Daniel Thomas Smith, San Diego, CA (US); Adam Thomas Gillespie, San Diego, CA (US); Timothy Charles Logasso, Sunland, CA (US)

(73) Assignee: Digital River, Inc., Minnetonka, MN (US)

(*) Notice: Subject to any disclaimer, the term of this patent is extended or adjusted under 35 U.S.C. 154(b) by 188 days.

This patent is subject to a terminal disclaimer.

(21) Appl. No.: 12/116,125

(22) Filed: May 6, 2008

(65) Prior Publication Data

US 2009/0043747 A1    Feb. 12, 2009

Related U.S. Application Data

(60) Provisional application No. 60/916,685, filed on May 8, 2007.

(51) Int. Cl.
*G06F 17/30* (2006.01)

(52) U.S. Cl.
CPC .................... *G06F 17/30867* (2013.01)
USPC .......................................................... 707/705

(58) Field of Classification Search
CPC ............ G06F 17/30867; G06F 17/30699; G06F 17/30702
USPC ............. 707/4, 754, 736, 769, 802, 705; 709/206, 224

See application file for complete search history.

(56) References Cited

U.S. PATENT DOCUMENTS

| 5,701,461 | A | | 12/1997 | Dalal et al. |
| 5,787,274 | A | * | 7/1998 | Agrawal et al. ........................ 1/1 |
| 5,970,469 | A | * | 10/1999 | Scroggie et al. ............ 705/14.26 |
| 6,026,397 | A | * | 2/2000 | Sheppard .............................. 1/1 |
| 6,169,992 | B1 | | 1/2001 | Beall et al. |
| 6,202,063 | B1 | | 3/2001 | Benedikt et al. |
| 6,230,156 | B1 | | 5/2001 | Hussey |
| 6,334,110 | B1 | * | 12/2001 | Walter et al. ................ 705/14.41 |
| 6,571,279 | B1 | * | 5/2003 | Herz et al. ...................... 709/217 |
| 6,954,748 | B2 | | 10/2005 | Dettinger et al. |
| 6,954,758 | B1 | * | 10/2005 | O'Flaherty .................... 707/802 |
| 6,985,962 | B2 | | 1/2006 | Phyllyyaw |
| 7,050,989 | B1 | * | 5/2006 | Hurt et al. ................... 705/14.51 |
| 7,167,877 | B2 | | 1/2007 | Balogh et al. |
| 7,231,407 | B2 | | 6/2007 | Brodersen et al. |

(Continued)

OTHER PUBLICATIONS http://web.archive.org/web/20051228034011/http://www.bluehornet.com/site/technology/smart_lists.htm, Dec. 28, 2005.*

(Continued)

*Primary Examiner* — Sheree Brown
(74) *Attorney, Agent, or Firm* — Billion & Armitage; Richard E. Billion (57) ABSTRACT

Remote segmentation is a process by which segmentation data is collected from a third party and applied to an existing database. In a preferred embodiment of remote segmentation, a definition is added that makes the local system aware of all the possible segmentation dimensions in a way that is presentable to the user as well as transmittable to a third party (in house or other company) which processes the segment and returns the result.

18 Claims, 7 Drawing Sheets

(56) References Cited

U.S. PATENT DOCUMENTS

| | | |
|---|---|---|
| 7,249,048 B1 * | 7/2007 | O'Flaherty ............... 705/7.27 |
| 7,281,206 B2 | 10/2007 | Schnelle et al. |
| 7,315,861 B2 | 1/2008 | Seibel et al. |
| 7,337,127 B1 | 2/2008 | Smith et al. |
| 7,356,533 B1 | 4/2008 | Schneiter et al. |
| 7,359,078 B2 | 4/2008 | Czyszczewski et al. |
| 7,406,434 B1 | 7/2008 | Chang et al. |
| 7,424,439 B1 * | 9/2008 | Fayyad et al. ............. 705/7.33 |
| 7,640,322 B2 * | 12/2009 | Wendkos et al. ............ 709/219 |
| 7,761,457 B2 * | 7/2010 | Error et al. ............... 707/754 |
| 8,224,691 B1 * | 7/2012 | Scroggie et al. ............ 705/14.1 |
| 2001/0052009 A1 | 12/2001 | Desai et al. |
| 2002/0004754 A1 * | 1/2002 | Gardenswartz et al. ........ 705/26 |
| 2002/0032602 A1 | 3/2002 | Lanzillo, Jr. et al. |
| 2002/0057272 A1 | 5/2002 | Hamada et al. |
| 2002/0073399 A1 | 6/2002 | Golden |
| 2002/0174011 A1 * | 11/2002 | Sanchez et al. ............. 705/14 |
| 2002/0191033 A1 | 12/2002 | Roberts |
| 2003/0018898 A1 | 1/2003 | Lection et al. |
| 2003/0046338 A1 | 3/2003 | Runkis |
| 2003/0144955 A1 | 7/2003 | Kim |
| 2003/0200137 A1 | 10/2003 | Drummond |
| 2003/0208458 A1 | 11/2003 | Dettinger et al. |
| 2003/0212676 A1 | 11/2003 | Bruce et al. |
| 2005/0075946 A1 * | 4/2005 | Henning et al. ............. 705/26 |
| 2005/0187971 A1 | 8/2005 | Hassan et al. |
| 2007/0112614 A1 | 5/2007 | Maga et al. |
| 2007/0124399 A1 * | 5/2007 | Gillespie et al. ............. 709/206 |
| 2007/0124401 A1 * | 5/2007 | Gillespie et al. ............. 709/206 |
| 2007/0124404 A1 * | 5/2007 | Gillespie ................... 709/206 |
| 2007/0130118 A1 | 6/2007 | Ganduri et al. |
| 2008/0010265 A1 | 1/2008 | Bangel et al. |
| 2008/0010351 A1 * | 1/2008 | Wardhaugh et al. .......... 709/206 |
| 2011/0184793 A1 | 7/2011 | Bohannon et al. |

OTHER PUBLICATIONS http://www.bluehornet.com/about/digital-river-companies, 2004.*
Bulk Email Marketing List Management. Silverpop, 2006.*
Ranchero Software Smartlist., Newsgator Technologies, Inc., 2006.*
Dataviz Smartlist to Go V3.0 CD-ROM, The Palm Store, 2006.*
Notice of Allowance, U.S. Appl. No. 11/565,618, Now US Patent# 851057.*

* cited by examiner

Currency: [Choose Currency ▼]

*Customers who [have not ▼] purchased [specific products ▼]

*Enter ID(s)

☑ Filter by time frame

[on ▼] [📅] 25 Apr 2007

☑ Filter by locale and currency

Locale: [en_US / ar_AE / ar_SA / da_DK / de_AT / de_CH / de_DE / en_AU / en_BE / en_CA ▼]

Currency: [Choose Currency ▼]

REMOTE SEGMENTATION SYSTEM AND METHOD

This application claims the benefit of U.S. Provisional Application No. 60/916,685 filed 8 May 2007, entitled "Remote Segmentation," which is incorporated herein by reference.

FIELD OF THE INVENTION

The present invention relates generally to relational database management systems and applications using such systems. In particular, it relates to a software system that collects segmentation data.

BACKGROUND OF THE INVENTION

The ability to market a product or service to individuals who are accessible on the Internet is becoming increasingly important. Email systems exist today for sending email to a target set of email addresses for purposes such as marketing, information acquisition, and otherwise. A system for sending email to a number of email targets for such purposes is called an email campaign.

In addition, the Internet provides the capability to provide services to customers without requiring them to install additional software on their local computers. Specifically, by exploiting the customer's web browser, all functional logic and all data can reside at a remote server rather than at the customer's local computer (i.e., the client). As such, the customer, via instructions submitted through web pages that are displayed in the web browser, can remotely invoke the functional logic to view, create, update, delete or otherwise modify the data residing on the remote server.

Furthermore, computer databases or similar constructions are powerful tools for storage, organization, retrieval and other handling of various types of information. However, there are different database models, or formats, for data access that are incompatible with each other, and may also be incompatible with, or remarkably different from, an object programming application. In this respect, complex relationships between objects present in the object programming application may be entirely absent in a relational or object database being accessed or updated. Nonetheless, many of these database types have achieved a high level of popularity and proliferation.

A distributed database is a database in which portions of the database are stored on multiple computers within a network. Users have access to the portion of the database at their location so that they can access the data relevant to their tasks without interfering with the work of others. A centralized distributed database management system (DDBMS) manages the database as if it were all stored on the same computer. The DDBMS synchronizes all the data periodically and, in cases where multiple users must access the same data, ensures that updates and deletes performed on the data at one location will be automatically reflected in the data stored elsewhere.

Collections of data such as in a database can be distributed across multiple physical locations. A distributed database is distributed into separate partitions and fragments. Each partition and fragment of a distributed database may be replicated. Besides distributed database replication and fragmentation, there are many other distributed database design technologies. For example, there are local autonomy, synchronous and asynchronous distributed database technologies. These technologies' implementation depends on the needs of the business and the sensitivity and confidentiality of the data to be stored in the database, and hence the price the business is willing to spend on ensuring data security, consistency and integrity. Also, a database server is the software managing a database, and a client is an application that requests information from a server. Each computer in a system is a node. A node in a distributed database system acts as a client, a server, or both, depending on the situation.

Furthermore, there are advantages of distributed databases. This is reflected in organizational structure. Database fragments are located in the departments they relate to. A department can control the data about them, giving them local autonomy. There is improved availability; a fault in one database system will only affect one fragment, instead of the entire database. Additionally, there is improved performance because data is located near the site of greatest demand and the database systems themselves are parallelized, allowing load on the databases to be balanced among servers. A high load on one module of the database will not affect other modules of the database in a distributed database.

From an economic standpoint, it costs less to create a network of smaller computers with the power of a single large computer. Also, systems can be modified, added and removed from the distributed database without affecting other modules (systems). However, increased complexity and a more extensive infrastructure means extra labor costs. Furthermore, remote database fragments must be secured, and they are not centralized so the remote sites must be secured as well. The infrastructure must also be secured (e.g., by encrypting the network links between remote sites).

Email service providers face problems. The solution is to have database administrators and application developers retain control over their data warehouse and marketers have the flexibility to change variables in their segmentation without making an additional request to the information technology (IT) staff. Businesses often struggle to maintain a working relationship between transactional and marketing data. Often, the data required to make decisions lives in a custom data warehouse which can only be queried via custom requirements in an on-demand fashion. Making transaction level data available directly to a marketer can be cause for concern for IT staff and often requires some knowledge about relational databases and how to interact with them.

Accordingly, there is a strong need for more efficient and flexible data collection from a third party to be applied to an existing database. There is a need for an internal system to make segmentation calls to other non-email service provider data sources and those sources, combined with client requirements. The present invention provides a solution to these needs and other problems, and offers other advantages over the prior art.

BRIEF SUMMARY OF THE INVENTION

The present invention is related to a software system that solves the above-mentioned problems. Some sort of behavior information about an individual may be located in a database in various areas. It will be understood by one of ordinary skill in the art that these areas may be disjointed or separated. The behavior information can include profiles of subscribers. The customer profiles have data such as demographics, preferences, and behaviors, but are not limited to this list.

Customers can also subscribe to an email list. Subscriber list profiles can be located in various e-commerce platforms. Furthermore, the database may be owned by a third party, including clients and vendors. In one embodiment of remote segmentation system and method, a request is sent to an owner of a database for a subset of information. The response includes a list of people that match the request. In a very simple example, the request asks for all people who did not purchase a Movado 24-carat gold plated watch. The response will then segment the database to contain all customers who purchased items excluding the specified watch, without saving the segment and overloading the current system. A user, marketer, or client can then send a message to the customers in the segment.

Also, in a preferred embodiment, remote segmentation provides the ability for a cast or bid party to define a user interface in an application that exposes or limits parameters to access the data (such as customer behavior). This allows a user to make categories, items, parameters, etc. available in the flexible user interface based on definitions entered by the third party customer.

In another embodiment, a user may receive fresh or updated data requests through the user interface for data segments. For example, the user may request "freshness" values for a data expiration window without making multiple requests for the entire data stores, thereby reducing strain on the third party. Also, in a further functional embodiment the format of the response and requests may be in extensible markup language (XML) or text format. Additionally, while utilizing remote segmentation as a whole, a user has the ability to approve peripheral actions such as email campaign functionality. Finally, in another preferred embodiment, the user has the ability to request a count or number of the specified data instead of the actual data itself.

Additional advantages and features of the invention will be set forth in part in the description which follows, and in part, will become apparent to those skilled in the art upon examination of the following or may be learned by practice of the invention.

DETAILED DESCRIPTION

Remote segmentation is a process by which segmentation data is collected from a third party and applied to an existing database. In a preferred embodiment of remote segmentation, a definition is added that makes the local system aware of all the possible segmentation dimensions in a way that is presentable to the user as well as transmittable to a third party (in house or other company) which processes the segment and returns the result.

Some e-commerce companies offer the ability to send a request for a segment and get a result, but it is up to the user to wrap a user interface around that. In a preferred embodiment, remote segmentation is a system that can consume the types of data a segmentation engine can crunch and giving the user an interface that changes based on the different types of data the third party holds.

For example, a user wishes to create an email campaign for an airline company that has a promotion for discounted tickets to Greece. Database A, located in a remote location from the company, contains a list of one hundred email addresses. The user logs into a system that has a user interface and specifies a list of parameters. The parameters create a query for people who speak the Greek language. A remote segmentation engine sends the query to database A with a request for how many people speak Greek. The database A sends back a reply with Bob Smith's name and email (or any other requested information) as a person who speaks Greek. The remote segmentation engine then utilizes Bob Smith in a segment. The user then can send a message to the segmented population with details about discounted tickets. Thus, the remote segmentation system does not store the segment or any information about the segment. Instead, the system sends requests to remote databases and matches the request to create an intersection of information. It will be understood by one of ordinary skill in the art that the remote database could be any external source of information. It will also be understood that a segment can also be an external group.

The customer profiles have data such as demographics, preferences, and behaviors, but are not limited to this list. Customers can also subscribe to an email list. Subscriber list profiles can be located in various e-commerce platforms. Furthermore, the database may be owned by a third party, including clients and vendors.

Definitions in Table 1 are intended to clarify terms and concepts used within this document.

TABLE 1

| Commonly Used Terms | |
|---|---|
| Term | Definition |
| ISP | Internet Service Provider at which a subscriber's email address resides. |
| Subscriber | A contact within an e-commerce system which has an email address. |
| Deliverability | A word used to describe the success of an email message's effectiveness. This is measured with the fields in the e-commerce system that indicate how many messages reached |

TABLE 1-continued

Commonly Used Terms

| Term | Definition |
| --- | --- |
| | recipients and how many messages were bounced, received, etc. |
| Smart List | The name for a feature in an e-commerce system that is a saved query. These saved queries can be used to generate a list of subscriber email addresses located in the e-commerce database. |
| Exclusion | The ability to choose a list of email addresses in a system which does not include any of the email addresses on another list. |
| Marketer | A marketer is someone whose job it is to present a good or service to the market place in an attractive way so that others will be tempted to buy it. For purposes of this document, it may be interchanged with a user, staff, or administrator. |

Remote segmentation system and method provides a method for customers to populate groups in the system without having to make application programming interface (API) calls to the email service provider system. Remote segmentation has a remote control functionality that allows users to populate groups in the system from an external data source without logging into the system. A data source can be any file transfer protocol (FTP) site where customers post files of email addresses. The system has a checking mechanism in a message sending process that identifies when a message contains an external group and when it does not contain an external group. Furthermore, the system includes an end tag convention that customers use with external group files to ensure file retrieval.

In a preferred embodiment of remote segmentation system and method, the user interface allows the creation of external groups. Furthermore, it allows the user to define an external data source for the group and to include the definition of the path to the external group FTP location. The user can change the number of fields in the external group file in the remote location. Remote segmentation system also has approval process screens that include an approval process for the first few times the external group is utilized. The screen allows the user to view the message and have buttons that allow the user to approve the message for sending or send it back to drafts database. Failure state screens in the user interface identify failure messages when a file does not exist at the location specified for the external group. Additionally, in client accounts and subaccounts the remote segmentation feature may be activated or deactivated.

In another embodiment, a user may receive fresh or updated data requests through the user interface for data segments. For example, the user may request "freshness" values for a data expiration window without making multiple requests for the entire data stores, thereby reducing strain on the third party. The user can define the following properties for an external group: type of file, number of fields, define field names, order of fields, and minimum refresh time. Minimum refresh time defines whether the contents of the external group are to be updated each time a message is sent using the external group. This would be defined by a time parameter. For example: if update time=now (0) then the external group would be populated with data from the external source each time the group is used in a message send. If the update time=once per week (7) then the external group would update the contents of the group from the external source once per week. Also, the user has the ability to request a count or number of the specified data instead of the actual data itself.

It will be understood by one of ordinary skill in the art that the user interface is variable and defined as a part of remote segmentation. The resulting user interface changes based on what is required of the remote segmentation engine. Remote segmentation is a system that can consume the types of data a segmentation engine can crunch and giving the user an interface that changes based on the different types of data the third party holds.

Figure 1:
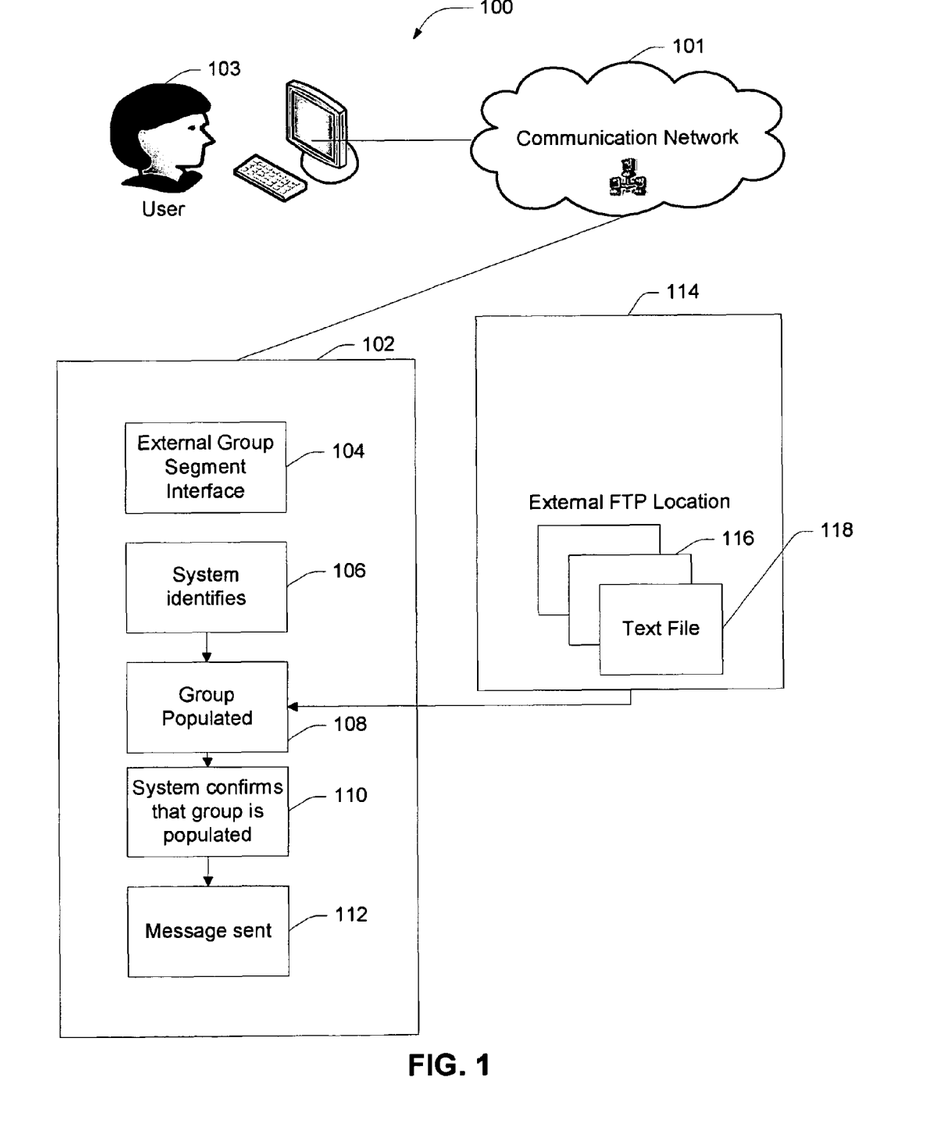
FIG. 1 shows a flow diagram for an e-commerce system working with a remote segmentation system.

FIG. 1 shows a flow diagram 100 for an e-commerce system working with the remote segmentation system. It will be understood that a user 103 accesses a communication network 101 to work with remote segmentation system and method. Box 102 illustrates an e-commerce system. External group interface 104 is the information needed to access remote segments. It will be understood that external group is another name for a remote segment. External group interface 104 contains information such as names of files, definitions for remote segments, types of actions needed to be performed, and protocols such as File Transfer Protocol (FTP), Hypertext transfer protocol (HTTP), and Gopher. It will be understood by one of ordinary skill in the art that the information in External group interface 104 is not limited to those listed.

Referring again to FIG. 1, remote segmentation system and method identifies 106 whether or not a message is utilizing an external group. Then, a group is populated 108 by getting a reply back for a list of names to send to a segmented population. This reply is taken from an external FTP location (for example) and contains a text file 118 and other external group files 116 that have a list of email addresses. The system confirms that the group is populated 110 and the message is sent 112. Table 2 outlines an example use case of remote segmentation.

TABLE 2

Use Case
Use Case

A system user creates a FTP location where they can post files containing email addresses, first name, last name, and custom fields. The user then creates external groups in the system on a new external groups page. This page allows them to create groups and to identify the path and login information for the location of the data for the external group. Custom fields can be mapped in this step. The user also configures minimum refresh time in days and data base action (clear and replace, merge, etc.). The user then creates messages that will use the external groups and schedules them for sending.
At the time of message send, the system detects that the message to be sent contains an external group. The system uses the FTP information that was entered into the system on the external groups page. The system retrieves the email addresses and fields that were located in the TABLE 2-continued Use Case
Use Case specified external groups file and places them in the system using the import process. The message is then sent using that data.

Figure 2:
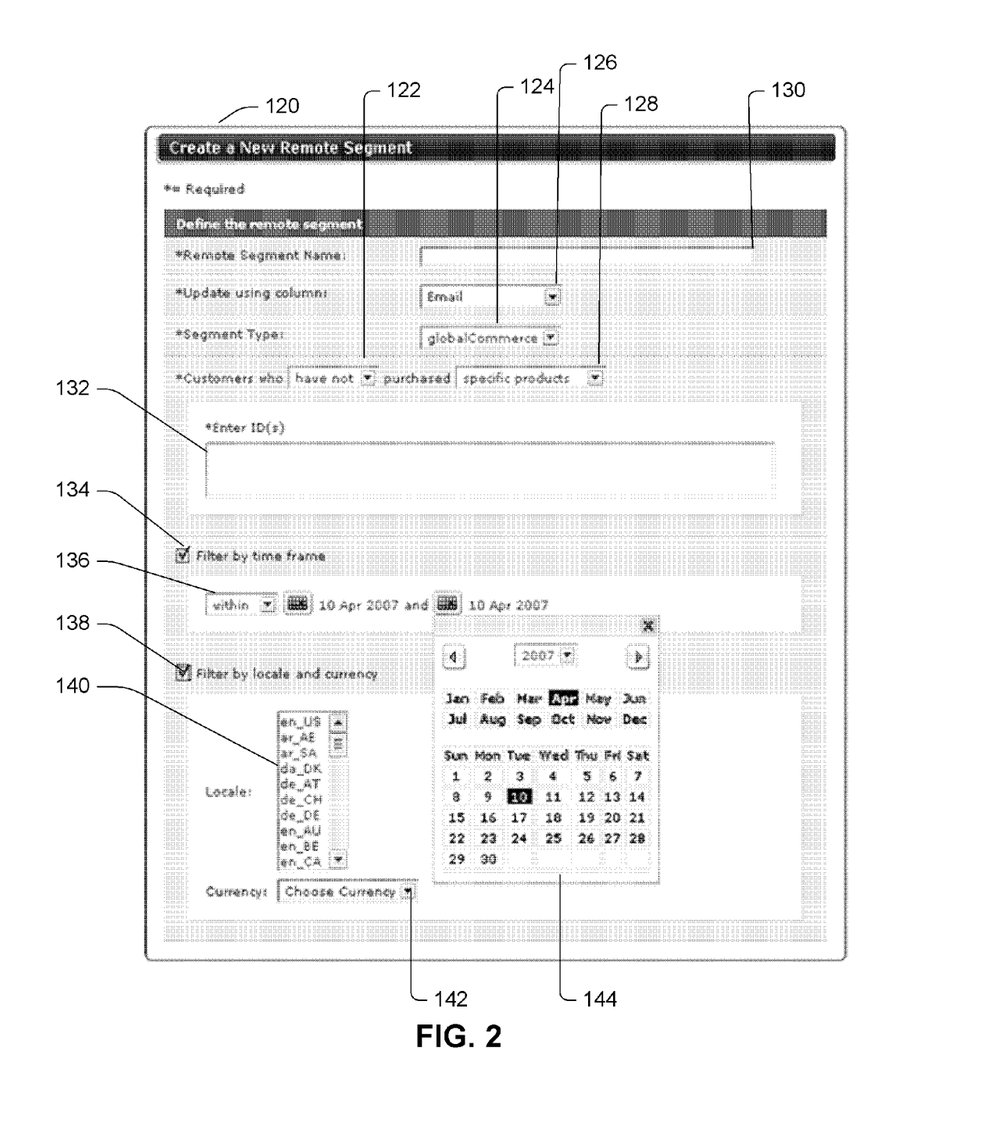
FIG. 2 describes a sample remote segmentation system user interface.

Referring now to FIG. 2, a sample remote segmentation user interface 120 is shown. In this interface, the user can define attributes for filtering an offset database into segments. For example, the user can choose a remote segment name 130 to classify the group they are about to filter. Furthermore, the user can choose to update a column type 126 and a segment type 124. In this particular interface 120, the filters are being set for a commercial system such as shopping online in a catalog. Accordingly, the user can choose to specify in box 122 and box 128 customers who have or have not purchased a product. The boxes 122 and 128 are drop down lists containing various options. Enter Identifications (IDs) 132 allows the user to add IDs to define the remote segment. The user can check filter by time frame box 134 to choose from drop down menu 136 the range of dates the remote segment should appear from (also in monthly format 144). Also, the user can check a filter by locale and currency box 138. This box 138, once checked, reveals locale options 140 and currency options 142.

Figure 3:
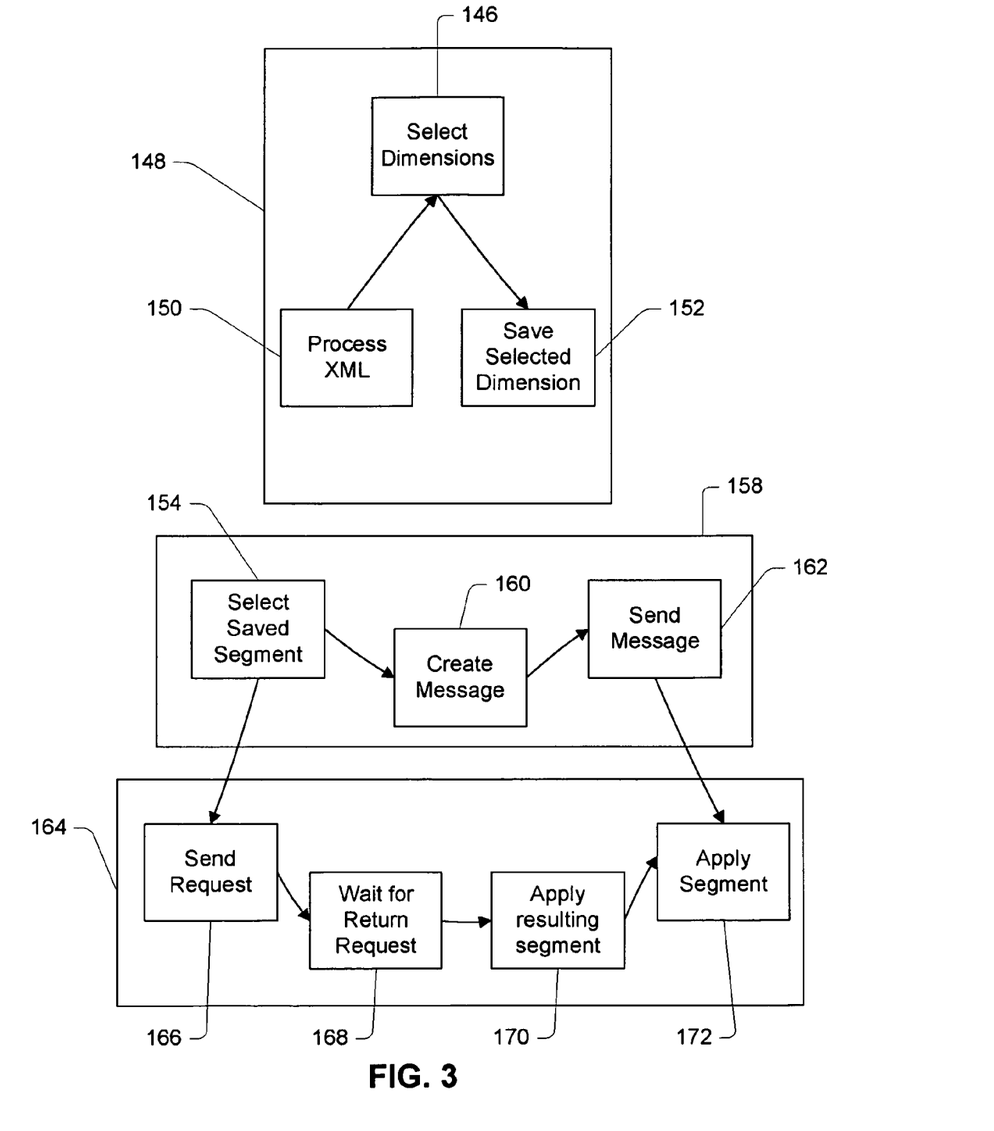
FIG. 3 illustrates an overview flow diagram of the remote segmentation system in more detail.

FIG. 3 illustrates an overview flow diagram of the remote segmentation system in more detail. Segment definition 148 shows how the user interacts with the interface from FIG. 2. First, extensible markup language (XML) is processed to present the user interface (shown in box 150). Then, the defined interface is presented. Next, the user can select dimensions 146 and their required values. The user can save selected dimensions 152 as a segment for future use. This information (selected dimensions) is saved in a database. Box 158 shows a user flow for messaging from the remote segments. The user selects a saved segment 154 from a mailing list (such as an email campaign). This sends a request 166 to a remote segmentation engine. The user then waits for request 168 to return and update the interface with total number in segment. Thus, information is sent to a remote system which then matches the information to a list. The resulting segment is applied 170 to the database. In other words, a query is sent to an offset database. The query has parameters, or filters, that list particular attributes. The offset database matches to the filters and then sends back a list for messaging purposes. Then, the segment is applied from the database to the message being composed 172. The message is created 160 and sent 162 to the mailing list. It will be understood that step 172 is a standard mail merge process. Steps 166, 168, 170 and 172 are the backend processing portion 164 of remote segmentation system.

In a preferred embodiment of remote segments, for successful implementation W3C Extensible Markup Language (XML) 1.0 standard (http://www.w3.org/XML/Core/) as well as the XML Schema 1.1 standard (http://www.w3.org/XML/Schema) can be utilized. Furthermore, remote segment system makes use of some industry standard encryption, authentication and filtering methods to maintain a high level of security when transmitting and receiving customer data. Using a combination of these technologies, customer data is secure and cannot be stolen while in transit between the client and email service provider. Some of the technologies employed by remote segments are Secure Sockets Layer (SSL), Secure FTP (FTP over SSL), HTTP Authentication and IP Filtering.

Moreover, an email service provider's remote segment functionality is comprised of three components which, when used together, create the usable remote segment. The first component is a remote segment type. The remote segment type template provides a set of parameters for the remote segment and at the very basic level gives the remote segment type a name and set of configuration options that can be manipulated by the user. The second component is the saved remote segment. The saved remote segment marries the defined remote segment type with the user defined parameters to create a logical request to the third component, a remote system. The remote system is a client implemented and maintained interface used by email service provider's remote segment functionality to request segment data from the client. The interface returns any modifications to the remote segment definition so the email service provider system knows where to locate the segment data.

Understanding an email service provider's interpretation of each user interaction with the XML configuration and how it affects the outcome of each remote segment is critical to successful implementation because it allows staff to define a flexible set of parameters a marketer can use to retrieve segmentation information, yet defines a box that allows the staff to protect its internal infrastructure from impossible queries.

The XML configuration cascades across the three different components of a remote segment and allows modification of previous definitions at each stage. The staff's role is to create an XML configuration for the remote segment type that defines a set of parameters the marketer can use to segment, (e.g., birth date, last purchase date, purchase categories). The request is made to the client's remote segment interface which responds with any changes to the original configuration.

Component 1: Remote Segment Type

In a preferred embodiment of remote segmentation system and method, the remote segment type defines a set of configuration options used by an email service provider to access the remote segmentation information as well as the options available to the marketer when defining which segment they want to mail. A basic remote segment type starts with the following XML document:

```
<?xml version="1.0" ?>
<remote_segment_type>
    <name>Name</name>
</remote_segment_type>
```

Furthermore, the XML document is expanded to define parameters surrounding the request communication protocol, request method, username and password. Note that if the request transport is defined as "none," the request is skipped and the remote segment data file is requested immediately.

```
<?xml version="1.0" ?>
<remote_segment_type>
    <name>Name</name>
    <request_transport>http</request_transport>
    <request_method>get</request_method>
    <request_url>http://www.clientsite.com/segments/</request_url>
    <request_username>test</request_username>
    <request_password>test</request_password>
</remote_segment_type>
```

Next, data transport, location and access information is added to reflect a data location. The resulting XML configuration contains "name" plus ten core XML tags needed by the remote segments functionality to retrieve and process data from the client's system.

```
<?xml version="1.0" ?>
<remote_segment_type>
    <name>Name</name>
    <request_transport>http</request_transport>
    <request_method>get</request_method>
    <request_url>http://www.clientsite.com/segments/</request_url>
    <request_username>test</request_username>
    <request_password>test</request_password>
    <data_transport>ftp</data_transport>
    <data_host>ftp.bluehornet.com</data_host>
    <data_username>test</data_username>
    <data_password>test</data_password>
    <data_file>test_file.txt</data_file>
</remote_segment_type>
```

Because data files are expected to be generated dynamically by a marketer's segmentation request, the request response can be a subset of the configuration XML defining the data access parameters. It will be understood by one of ordinary skill in the art that the following example XML could be in response to a request made to the client's interface.

```
<?xml version="1.0" ?>
<remote_segment_type>
    <data_transport>ftp</data_transport>
    <data_host>ftp.bluehornet.com</data_host>
    <data_username>test</data_username>
    <data_password>test</data_password>
    <data_file>test_file.txt</data_file>
</remote_segment_type>
```

Furthermore, the ability to override previously specified parameters gives the client flexibility to manipulate data storage locations, usernames, passwords and file names without having to make the email service provider remote segment functionality aware of the changes ahead of time.

Forms: Overview

The XML configuration allows the client's staff to create a marketer friendly interface to interact with available segmentation parameters. The available user interface elements are:
 Text box—equivalent to an HTML <input type="text">
 Password box—equivalent to an HTML <input type="password">
 Checkbox—equivalent to an HTML <input type="checkbox">
 Text area—equivalent to an HTML <textarea>
 Dropdown—equivalent to an HTML <select>
 Multibox—equivalent to an HTML <select multiple>
 Decision—a logical sentence that answers a variable question
 Date frame—a calendar that can select "before," "after," "on," and "within"

The best way to determine what XML tags and attributes are supported is via the available XSD. There is also a tag reference in Table 4.

Additionally, the XML configuration supports a set of attributes on each form object. Two attributes are required for each form object: "container" and "name" ("d1_name" for a Decision). If any "name" or "d_name" attribute is named the same as one of the ten core xml tags covered in the previous section, the value of that form object will override the originally defined XML value. This functionality is designed to let staff to build in overrides to their own configuration when exposed to the marketer.

Figure 4:
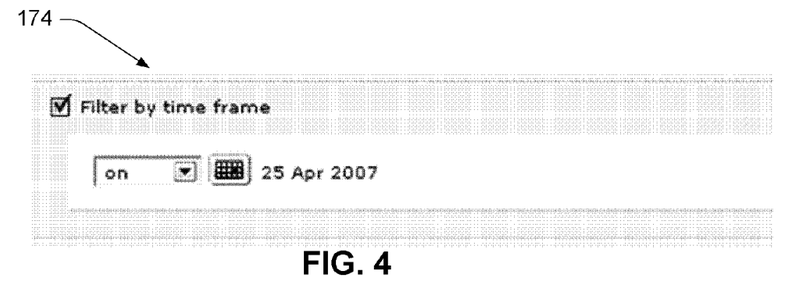
FIG. 4 illustrates a screen shot of setting a rule for filtering by time frame.

Expanding upon the previously defined XML, the following example offers the marketer the ability to enter a date range which will be transmitted to the client's interface as "date." FIG. 4 is the resulting user interface 174 from the following XML configuration example.

```
<?xml version="1.0" ?>
<remote_segment_type>
    <name>Name</name>
    <request_transport>http</request_transport>
    <request_method>get</request_method>
    <request_url>http://www.clientsite.com/segments/</request_url>
    <request_username>test</request_username>
    <request_password>test</request_password>
    <data_transport>ftp</data_transport>
    <data_host>ftp.bluehornet.com</data_host>
    <data_username>test</data_username>
    <data_password>test</data_password>
    <data_file>test_file.txt</data_file>
    <form>
        <checkbox name="t1" toggle="date" container="field">
            Filter by time frame
        </checkbox>
        <dateframe container="display" name="date" />
    </form>
</remote_segment_type>
```

Forms: Containers

Figure 5:
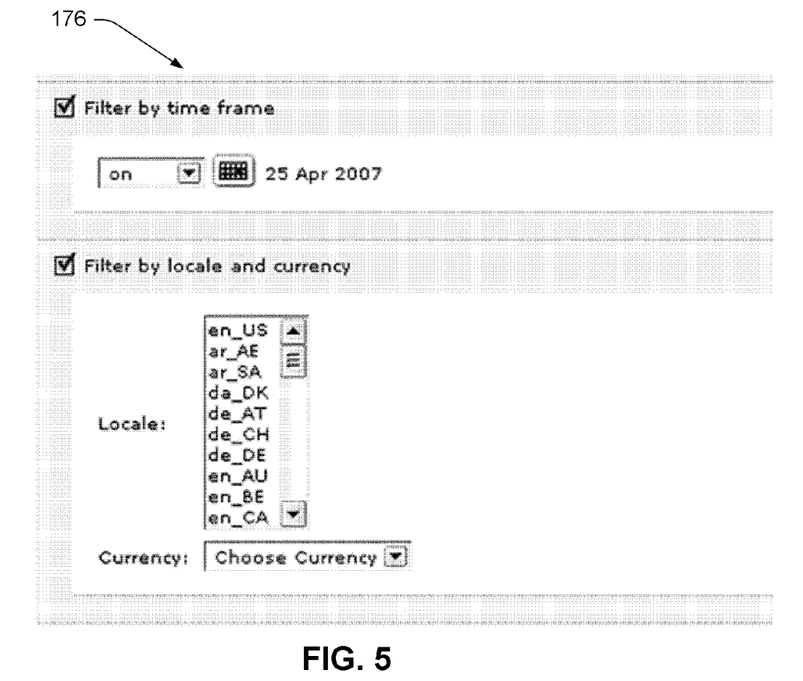
FIG. 5 illustrates a screen shot from FIG. 4 further including filtering by locale and currency.

In another preferred embodiment of remote segmentation system and method, containers allow staff to group logically similar form items together to create a user friendly interface for the marketer. For example, if the marketer is allowed to select multiple locales for a segment of transactions as well as a specific currency, but these two parameters must be specified together, the XML configuration could be modified to include a checkbox which toggles the visibility of these two fields. Using the "field" container followed by a collection of "display" containers, the checkbox toggles the entire "display" container referencing it by the name of the first form within that container. In this scenario, the checkbox is toggling the "locale" multibox which is in a "display" container with "currency." In this example, an additional toggle checkbox was added to the dateframe tag. FIG. 5 is the resulting user interface 176 from the following XML configuration example.

```
<?xml version="1.0" ?>
<remote_segment_type>
    <name>Name</name>
    <request_transport>http</request_transport>
    <request_method>get</request_method>
    <request_url>http://www.clientsite.com/segments/</request_url>
    <request_username>test</request_username>
    <request_password>test</request_password>
    <data_transport>ftp</data_transport>
    <data_host>ftp.bluehornet.com</data_host>
    <data_username>test</data_username>
    <data_password>test</data_password>
    <data_file>test_file.txt</data_file>
    <form>
        <checkbox container="field" name="d_filter" toggle="date">
            Fitler by time frame
        </checkbox>
        <dateframe container="display" name="date" />
```

```
<checkbox container="field" name="lc_filter" toggle="locale">
    Filter by Locale and Currency
</checkbox>
<multibox container="display" name="locale" label="Locale">
    <option>en_US</option>
    ...
    <option>en_CA</option>
</multibox>
<dropdown container="display" name="currency" label="Currency">
    <option>USD</option>
    ....
    <option>CAD</option>
</dropdown>
</form>
</remote_segment_type>
```

Forms: Tags in Depth

There are eight form specific tag types that can be defined in the "form" section of the XML configuration. Below are attributes, example code and screen renderings for each of the eight available form tags.

Tag: <Decision>

Figure 6:
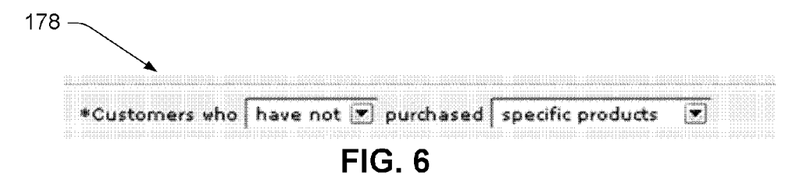
FIG. 6 illustrates a screen shot of setting a rule for customer purchases.

Attributes:
  required=[yes|no]
  container=[field|display]
  d1_name=CDATA
  d2_name=CDATA
  d3_name=CDATA
  d4_name=CDATA
  d5_name=CDATA
An example of the tag: <decision> is shown below, resulting in a user interface 178, as shown in FIG. 6.

```
<decision container="field" required="yes" d1_name="have"
d2_name="type">
    Customers who !@(have not|have)@! purchased
    !@(specific products|product categories)@!
</decision>
```

Tag: <Textarea>

Figure 7:
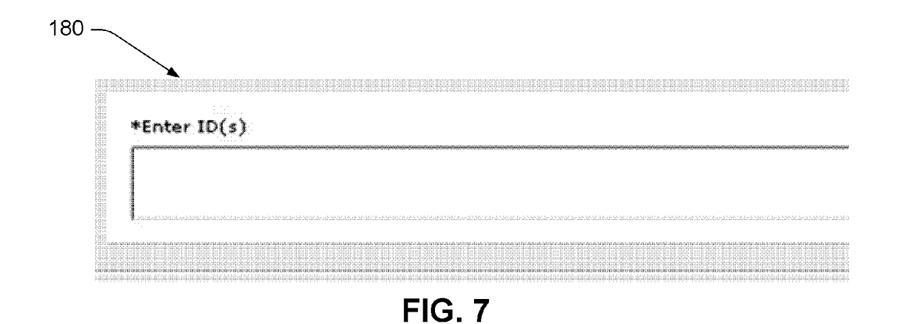
FIG. 7 illustrates a screen shot of adding user identification codes.

Attributes:
  required=[yes|no]
  container=[display]
  name=CDATA
An example of the tag: <textarea> is shown below, resulting in a user interface 180, as shown in FIG. 7.

```
<textarea container="display" required="yes" name="id_list">
    Enter ID(s)
</textarea>
```

Tag: <Checkbox>

Figure 8:
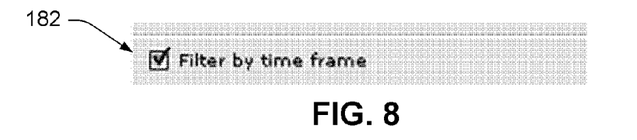
FIG. 8 shows a screen shot for selecting a box for time frame.

Attributes:
  required=[yes|no]
  container=[field|display]
  name=CDATA
  toggle=CDATA (Reference to another tag name)
An example of the tag: <checkbox> is shown below, resulting in a user interface 182, as shown in FIG. 8.

```
<checkbox container="field" name="time" toggle="date">
    Filter by time frame
</checkbox>
```

Tag: <Textbox>

Figure 9:
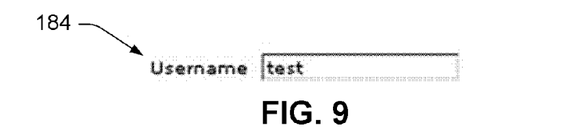
FIG. 9 shows a screen shot for adding a username.

Attributes:
  required=[yes|no]
  container=[display]
  name=CDATA
An example of the tag: <textbox> is shown below, resulting in a user interface 184, as shown in FIG. 9.

```
<textbox container="display" name="data_username">
    Username
</textbox>
```

Tag: <Passwordbox>

Figure 10:
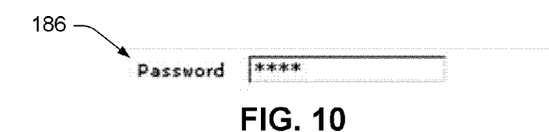
FIG. 10 illustrates a screen shot for adding a password.

Attributes:
  required=[yes|no]
  container=[display]
  name=CDATA
An example of the tag: <passwordbox> is shown below, resulting in a user interface 186, as shown in FIG. 10.

```
<passwordbox container="display" name="data_password">
    Password
</passwordbox>
```

Tag: <Dateframe>

Figure 11:
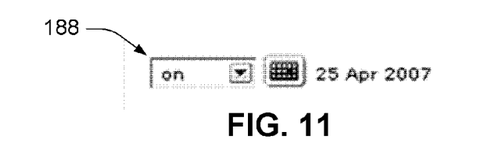
FIG. 11 illustrates a screen shot for changing a date.

Attributes:
  required=[yes|no]
  container=[display]
  name=CDATA
An example of the tag: <dateframe> is shown below, resulting in a user interface 188, as shown in FIG. 11.
  <dateframe container="display" name="date"></dateframe>

Tag: <Multibox>

Figure 12:
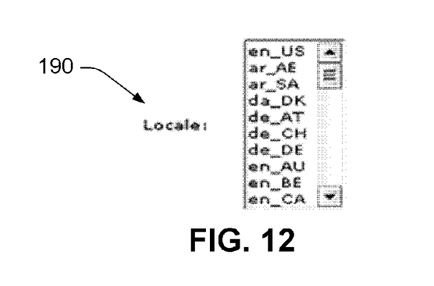
FIG. 12 illustrates a screen shot for changing a locale.

Attributes:
  required=[yes|no]
  container=[display]
  name=CDATA
  label=CDATA
Children:
  <option>
An example of a tag: <multibox> is shown below, resulting in a user interface 190, as shown in FIG. 12.

```
<multibox container="display" name="locale" label="Locale">
    <option>en_US</option>
    <option>en_CA</option>
</multibox>
```

Tag: <Dropdown>

Figure 13:
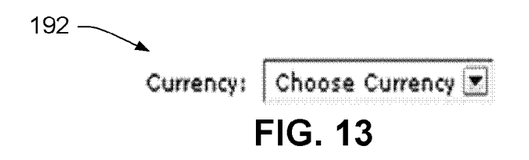
FIG. 13 shows a screen shot for changing currency.

Attributes:
   required=[yes|no]
   container=[display]
   name=CDATA
   label=CDATA
Children:
   <option>
An example of a tag: <dropdown> is shown below, resulting in a user interface 192, as shown in FIG. 13.

```
<dropdown container="display" name="currency" label="Currency">
   <option>USD</option>
   <option>CAD</option>
</dropdown>
```

Tag: <Option>

Attributes:
   value=CDATA
Parents:
   <multibox>, <dropdown>
An example of this tag: <option> is shown below.
<option>USD</option>

Forms: Putting it all Together

Figure 14:
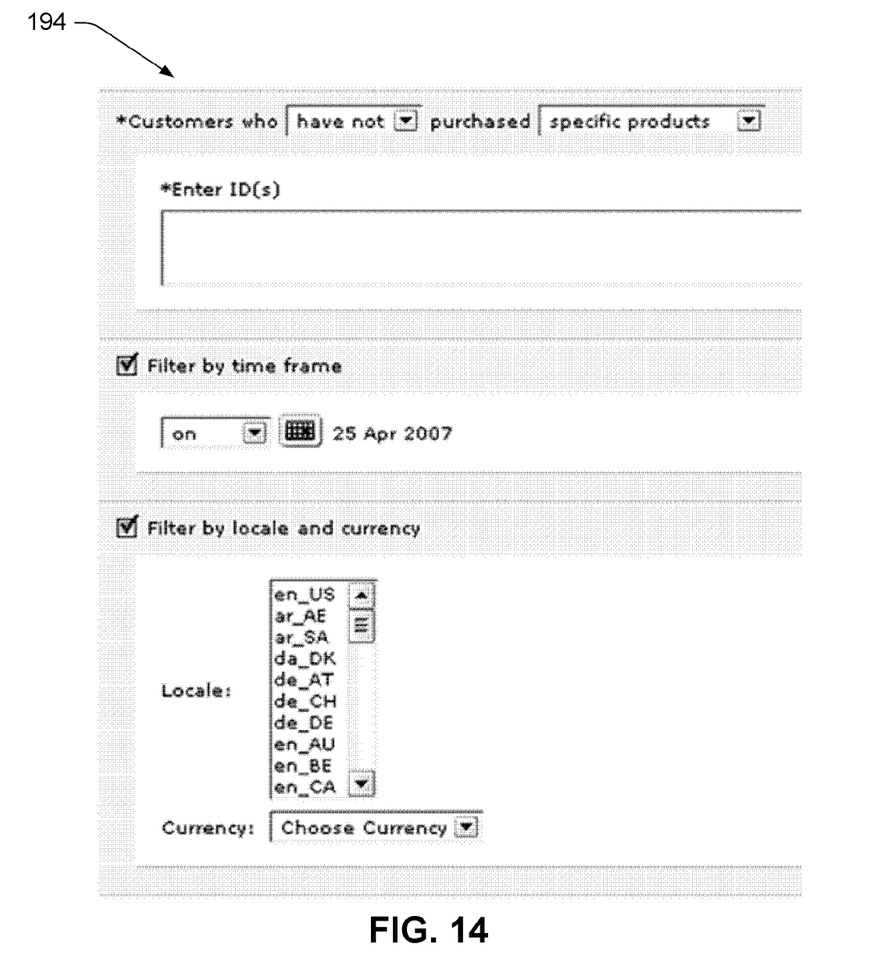
FIG. 14 shows a screen shot combining FIGS. 6-13.

Shown below is an example XML configuration specific to an internal commerce data structure. In a preferred embodiment of remote segmentation system and method, the final XML configuration is similar. This results in a complex interface 194, as illustrated in FIG. 14.

```
<?xml version="1.0"?>
<remote_segment_type>
   <name>globalCommerce</name>
   <request_transport>http</request_transport>
   <request_url></request_url>
   <data_transport>http</data_transport>
   <data_host></data_host>
   <data_username></data_username>
   <data_password></data_password>
   <data_file></data_file>
   <form>
      <decision container="field" required="yes"
      d1_name="have" d2_name="type">
         Customers who !@(have not|have)@! purchased
         !@(specific products|product categories)@!
      </decision>
      <textarea container="display" required="yes" name="id_list">
         Enter ID(s)
      </textarea>
      <checkbox container="field" name="time" toggle="date">
         Filter by time frame
      </checkbox>
      <dateframe container="display" name="date">Test</dateframe>
      <checkbox container="field" name="locale" toggle="locale">
         Filter by locale and currency
      </checkbox>
      <multibox container="display" name="locale" label="Locale">
         <option>en_US</option>
         ...
         <option>en_CA</option>
      </multibox>
      <dropdown container="display" name="currency" label="Currency">
         <option value="">Choose Currency</option>
         <option>USD</option>
         ...
         <option>CAD</option>
      </dropdown>
```

```
   </form>
</remote_segment_type>
```

Component 2: Saved Remote Segment

Figure 15:
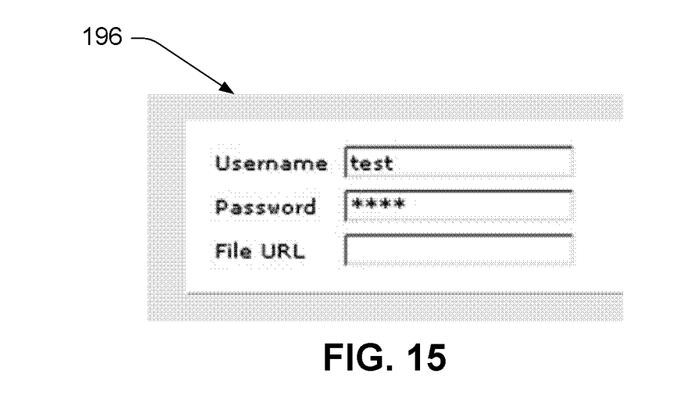
FIG. 15 illustrates a screen shot for username, password, and Uniform Resource Locator file name.

Saved remote segments are simply a set of parameters defined by the marketer within the context of the "form" tag from the remote segment type. For example, the following XML configuration results in an interface 196 as shown in FIG. 15.

```
<remote_segment_type>
   <name>HTTP</name>
   <data_transport>http</data_transport>
   <request_transport>none</request_transport>
   <form>
      <textbox container="display" name="data_username">
         Username
      </textbox>
      <passwordbox container="display" name="data_password">
         Password
      </passwordbox>
      <textbox container="display" name="data_file">
         File URL
      </textbox>
   </form>
</remote_segment_type>
```

If the marketer has defined a username, password and URL, the saved remote segment will store the values for each field presented to the marketer. Because the request_transport is "none," the remote segment functionality skips directly to the data file. Using HTTP, the remote segment functionality connects to data_file using data_username and data_password as authentication credentials.

Figure 16:
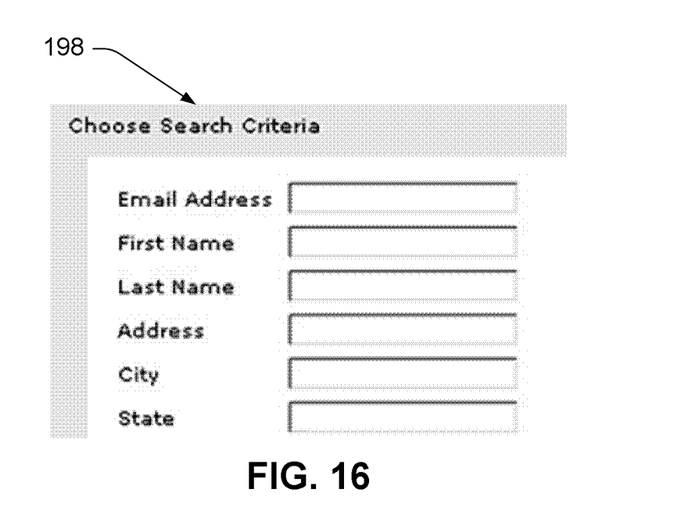
FIG. 16 illustrates a screen shot for choosing search criteria.

A more complex example including an initial request for data follows:

```
<remote_segment_type>
   <name>BH Search</name>
   <request_transport>http</request_transport>
   <request_method>get</request_method>
   <request_url>http://www.bluehornet.com/
   bh_search.php</request_url>
   <request_username>test</request_username>
   <request_password>test</request_password>
   <form>
      <decision container="field">Choose Search Criteria</decision>
      <textbox container="display" name="email">
         Email Address
      </textbox>
      <textbox container="display" name="firstname">
         First Name
      </textbox>
      <textbox container="display" name="lastname">
         Last Name
      </textbox>
      <textbox>
      <textbox container="display" name="address">Address</textbox>
      <textbox container="display" name="city">City</textbox>
      <textbox container="display" name="state">State</textbox>
   </form>
</remote_segment_type>
```

Resulting in a user interface 198, as shown in FIG. 16.
Assuming the marketer entered "CA" for state, the request URL will URL encode all parameters and append them as a query string to the request_url:
   http://www.bluehornet.com/bh_search.php?email=&
     firstname=&lastname=&address=&city=&state=CA

Component 3: Client-Side Remote Segment Interface

The client-side remote segment interface can be implemented in a number of ways. At the basic level, a client's IT staff can expose a set of data files made available on an ongoing basis. These data files can be referenced using the default "HTTP" or "FTP" remote segment types and can be made available to the marketer via a URL or host and file name.

For more complex implementations, a series of dynamic queries can be created to abstract the underlying data structures and expose a set of pre-defined parameters to the marketer. When using this type of implementation, understanding the way each form object affects the request is extremely important.

Tags, such as "textbox" and "passwordbox" pass the value directly as if the data was entered on a form; however, form objects such as the "dateframe" and "decision" create slightly different request parameters on the request_url. The following list of tags work outside of the "name=value" model commonly referred to as key/value pairs or query string parameters.

Tag: <Decision>

The decision tag utilizes up to five attributes d1_name, d2_name, d3_name, d4_name and d5_name, to name each of the dropdowns available within the decision tag.

```
<decision d1_name="fruit" d2_name="color">
    !@(Apples|Bananas)@! are !@(red|yellow)@!
</decision>
```

When "Apples" and "red" are selected, the following parameters will be added to the request:
    fruit=Apples&color=red

Tag: <Dateframe>

The dateframe's name is used as a base for a set of parameters required to transmit the date matching type and the date itself. Additionally, when "within" is selected, an additional date is passed to complete the date range.
    <dateframe name="date"></dateframe>
If "on" and the date "1 Apr. 2025" are selected, the following parameters will be added to the request:
    date_operator=on&date_single=2025-04-01
If "within," "1 Apr. 2025," and "29 Feb. 2026" are selected, the following parameters will be added to the request:
    date_operator=within&date_multiple1=2025-04-01&date_multiple2=2026-02-29

Tag: <Multibox>

The multibox allows the marketer to select more than one distinct option for a list of many. To support this, the name for the multibox is appended with [ ] to allow for some languages to accept this subset of the request as an array.

```
<multibox name="currency" label="Currency">
    <option>CAD</option>
    <option>USD</option>
</multibox>
```

If only "CAD" is selected, the following parameter will be added to the request:
    currency[ ]=CAD
If both "CAD" and "USD" are selected, the following parameters will be added to the request:
    currency[ ]=CAD¤cy[ ]=USD Table 3 describes an example XML language for remote segmentation. Table 4 describes XML configuration tags for quick reference purposes.

TABLE 3

Remote Segmentation XML Example

```
-<remote_segment_type>
    <name>globalCommerce</name>
    <data_transport>ftp</data_transport>
    <data_username />
    <data_password />
    <data_host />
    <data_file />
    <request_transport>http</request_transport>
    <request_url />
-<form>
    <decision container="field" required="yes" d1_name="have"
        d2_name="type">Customers who !@(have not|have|will never)@!
        purchased !@(specific products|product categories)@!</decision>
    <textarea container="display" required="yes" name="id_list">Enter
        ID(s)</textarea>
    <checkbox container="field" name="time" toggle="date">Filter by time
        frame</checkbox>
    <dateframe container="display" name="date">Test</dateframe>
    <checkbox container="field" name="locale" toggle="locale">Filter
 by locale
        and currency</checkbox>
-<multibox container="display" name="locale" label="Locale">
    <option>en_US</option>
    <option>ar_AE</option>
    <option>ar_SA</option>
    <option>da_DK</option>
    <option>de_AT</option>
    <option>de_CH</option>
    <option>de_DE</option>
    <option>en_AU</option>
    <option>en_BE</option>
    <option>en_CA</option>
    <option>en_CH</option>
    <option>en_FI</option>
    <option>en_GB</option>
    <option>en_HK</option>
    <option>en_IE</option>
    <option>en_IN</option>
    <option>en_MY</option>
    <option>en_NO</option>
    <option>en_NZ</option>
    <option>en_PR</option>
    <option>en_SG</option>
    <option>en_ZA</option>
    <option>es_AR</option>
    <option>es_CL</option>
    <option>es_CO</option>
    <option>es_ES</option>
    <option>es_MX</option>
    <option>es_PR</option>
    <option>fi_FI</option>
    <option>fr_BE</option>
    <option>fr_CH</option>
    <option>fr_FR</option>
    <option>it_IT</option>
    <option>iw_IL</option>
    <option>ja_JP</option>
    <option>ko_KR</option>
    <option>nl_NL</option>
    <option>no_NO</option>
    <option>pt_BR</option>
    <option>pt_PT</option>
    <option>sv_SE</option>
    <option>zh_CN</option>
    <option>zh_HK</option>
```

TABLE 3-continued

Remote Segmentation XML Example

```
<option>zh_TW</option>
    </multibox>
-<dropdown container="display" name="currency" label="Currency">
<option value="">Choose Currency</option>
<option>USD</option>
<option>USD-DUP</option>
<option>AED</option>
<option>ARS</option>
<option>AUD</option>
<option>BRL</option>
<option>CAD</option>
<option>CHF</option>
<option>CLP</option>
<option>CNY</option>
<option>COP</option>
<option>DKK</option>
<option>EUR</option>
<option>GBP</option>
<option>HKD</option>
<option>INR</option>
<option>JPY</option>
<option>KRW</option>
<option>MXN</option>
<option>MYR</option>
<option>NOK</option>
<option>NZD</option>
<option>PLN</option>
<option>SAR</option>
<option>SEK</option>
<option>SGD</option>
<option>SIT</option>
<option>TWD</option>
<option>ZAR</option>
    </dropdown>
  </form>
</remote_segment_type>
```

TABLE 4

XML Configuration Tag Quick Reference

| Tag Name | Attributes | Short Description |
|---|---|---|
| Name | none | The name of the remote segment type |
| request_transport | none | "none" or "http" |
| request_method | none | "get" or "post" |
| request_url | none | The URL |
| request_username | none | The authentication username for the request (HTTP only) |
| request_password | none | The authentication password for the request (HTTP only) |
| data_transport | none | "ftp," "http," or "local" ("local" is rarely used) |
| data_host | none | Hostname for the data location (FTP only) |
| data_username | none | The authentication username for the data location (FTP or HTTP) |
| data_password | none | The authentication password for the data location (FTP or HTTP) |
| data_file | none | The name of the file containing email addresses or email service provider internal contact id's |
| ssl_ftp | none | Set to "1" to use FTP over SSL. |
| Form | none | Contains marketer-visible form data. |
| decision | d1_name, d2_name, d3_name, d4_name, d5_name, container, required | A sentence that has a series of dropdowns and allows a marketer to make a logical decision. |
| textarea | name, container, required | A large area for text entry. |
| checkbox |  | A checkbox for toggling on and off. |
| textbox | name, container, required | A standard text box for short text. |
| passwordbox | name, container, required | A password box for hidden text. |
| dateframe | name, container, required | A date object supporting "on," "before," "after," and "within" |
| multibox | name, container, required, label | A box allowing selection of multiple items from a list. Accepts "option" tags. |
| dropdown | name, container, required, label | A dropdown allowing selection of a single item from a list. Accepts "option" tags. |

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the web interface such that different dialog boxes are presented to a user that are organized or designed differently while maintaining substantially the same functionality without departing from the scope and spirit of the present invention.

What is claimed is:

1. A computerized remote segmentation system for sending email messages to subscribers over a network, comprising:
   a computer including
   a segmentation definition module comprising a definition of segmentation dimensions used to query a remotely located database system comprising customer profile data and email addresses;
   a dynamic remote segmentation user interface (UI) to the segmentation definition module, the dynamic UI being operatively configured to create and save a remote segment comprising a name and template parameters, the dynamic UI including a set of attributes for filtering the remotely located database system into segments;
   a remote segmentation engine operatively configured to send the saved remote segment to the remotely located database system and receive a response comprising a dynamically created list of subscribers; and
   an email campaign manager containing program code which, when executed by a processor in a computer, causes the computer to perform operations of sending an email message over the network to a customer identified from the dynamically created list of subscriber, the list updated automatically as subscriber records and data are added to the remotely located database so that an email message sent over the network will be current and relevant to an identified customer.

2. The system of claim 1 wherein the segmentation dimensions comprise customer profile data chosen from a group consisting of:
   demographics, preferences, and behaviors.

3. The system of claim 1 wherein the remote segment parameters are selected from a group consisting of: customer identification categories, customer items, and group parameters.

4. The system of claim 1 wherein the segmentation dimensions comprise a time frame.

5. The system of claim 1 wherein the segmentation dimensions comprise one of a locale and currency.

6. The system of claim 1 wherein the remote segmentation engine is operatively configured to continually receive updated responses to the remote segment.

7. The system of claim 1 wherein the remote segmentation engine is operatively configured to utilize extensible markup language (XML) formatted query and response messages.

8. The system of claim 1 wherein the remote segmentation engine is operatively configured to utilize text formatted query and response messages.

9. The system of claim 1 wherein the remote segmentation engine is operatively configured to limit the response to number of specified data.

10. A method for segmenting data remotely on a network and sending email messages to subscribers over the network, including steps of:
    dynamically generating a remote segmentation user interface (UI) to a segmentation definition module comprising a definition of segmentation dimensions for creating a query to send to a remotely located database comprising customer profile data and email addresses;
    creating, through the remote segmentation dynamic UI, a remote segment comprising a name and remote segment template parameters, the dynamic UI including a set of attributes for filtering the remotely located database into segments based on segmentation dimensions;
    saving the remote segment;
    sending the remote segment to the remotely located database;
    receiving a response to the remote segment comprising a dynamically created list of subscribers including matched profile data and email addresses; and
    sending an email message over the network to a customer identified from the dynamically created list of subscribers, the list updated as subscriber records and data are added to the remotely located database so that an email message sent over the network will be current and relevant to an identified customer.

11. The method of claim 10 wherein the segmentation dimensions comprise customer profile data chosen from a group consisting of:
    demographics, preferences, and behaviors.

12. The method of claim 10 wherein the segmentation dimensions are selected from a group consisting of: customer identification categories, customer items, and group parameters.

13. The method of claim 10 wherein the creating step further comprises creating the remote segment with a time frame.

14. The method of claim 10 wherein the creating step further comprises creating the remote segment with locale and currency.

15. The method of claim 10 wherein the receiving step further includes obtaining updated responses to the remote segment.

16. The method of claim 10 wherein the sending and receiving steps with the remotely located database comprise utilizing extensible markup language (XML) formatted query and response messages.

17. The method of claim 10 wherein the sending and receiving steps with the remotely located database comprise utilizing text formatted query and response messages.

18. The method of claim 10 further including a step of limiting the response to a number of specified records.

* * * * *